United States Patent [19]

Baccarani

[11] Patent Number: 5,282,879
[45] Date of Patent: Feb. 1, 1994

[54] CONTINUOUS PROCESS FOR THE PREPARATION OF FERTILIZERS FROM ANIMAL WASTE

[75] Inventor: Celeste Baccarani, Ravenna, Italy

[73] Assignee: Enichem Agricoltura S.P.A., Palermo, Italy

[21] Appl. No.: 833,788

[22] Filed: Feb. 12, 1992

[30] Foreign Application Priority Data

Feb. 13, 1991 [IT] Italy .................. 000376 A/91

[51] Int. Cl.$^5$ .......................... C05F 3/00; C05F 9/04; C05F 17/00
[52] U.S. Cl. .......................... 71/10; 71/15; 210/754; 210/759
[58] Field of Search .............. 210/754, 759; 71/10, 71/15

[56] References Cited

U.S. PATENT DOCUMENTS 3,640,696  2/1972  Goldman ........................ 71/9
4,541,986  9/1985  Schwab et al. ................. 210/754

FOREIGN PATENT DOCUMENTS 370565  5/1990  European Pat. Off. ............. 71/21
8746  8/1990  PCT Int'l Appl. ................. 71/8

*Primary Examiner*—Ferris Lander
*Attorney, Agent, or Firm*—Oblon, Spivak, McClelland, Maier & Neustadt

[57] ABSTRACT

A continuous process is described for the preparation of fertilizers from animal waste consisting of the following steps:
a) anaerobic fermentation of waste up to BOD$_5$ of 300–2000,
b) treatment with HNO$_3$ up to pH 1–2,
c) treatment with Ca(OH) up to pH 6.5–7 and S.A.R. index <6, with the addition of small quantities of H$_2$O$_2$ before or after step c).

4 Claims, No Drawings

CONTINUOUS PROCESS FOR THE PREPARATION OF FERTILIZERS FROM ANIMAL WASTE

The present invention relates to a continuous process for the preparation of fertilizers from animal waste.

Methods for the transformation of animal waste into fertilizers are already known. These basically consist of treating the waste with mineral acids and possibly oxidizers as described, for example, in U.S. Pat. No. 3.966.450, in U.S. Pat. No. 4.078.094 and European Patent Application 370565.

These methods, however, present considerable disadvantages mainly related to the quality of the product obtained, which does not generally meet with the law which regulates the distribution of waste containing pathogenous and/or polluting agents in the environment, and does not satisfy the salt content (S.A.R. index<6) necessary for its use as a fertilizer, making it insufficiently stable over a period of time and capable of producing badly-smelling and/or phytotoxic substances.

In addition, these known methods are difficult to carry out on an industrial scale using a continuous process which is both economical and ecologically safe and which enables the complete utilization of animal waste to obtain a fertilizer having constant quality, which is ecologically safe with no disadvantages for agricultural cultivations.

It has now been found that the draw-backs of the known method can be avoided by using a continuous process which includes a series of the following steps for the treatment of animal waste:
  a) anaerobic biological fermentation;
  b) treatment of the product obtained with $HNO_3$ under suitable pH conditions, temperature and duration;
  c) subsequent treatment with $Ca(OH)_2$ under critical pH conditions and the addition, either before or after step c), of small quantities of $H_2O_2$.

The process is continuous and is extremely versatile in that it enables the treatment and recovery of animal waste of any origin and consistency such as mixtures of excrements, urine, feeding residues, trough waste, washing water for animal rearing, in particular hogs, and litter residues, wherein all the treatment steps are integrated among each other and necessary for obtaining a fertilizer in an aqueous suspension, which is perfectly preservable, substantially without any unpleasant odours, pathogenous agents, or mycetes, and which is non-toxic and does not pollute the environment or in particular agricultural cultivations.

The product is also very valuable not only for the substantial and balanced presence of the main fertilizing elements (N,P,K) in an easily available form, as well as secondary elements (Ca, Mg and S) and useful microelements (B, Mn, Zn, Cu, Mo, Co, Fe), but mainly because it contributes to improving the productiveness of agricultural soil owing to the presence of certain dosages of biodegraded organic substances, including humic acids and fulvic acids, peptones and aminoacids, which contribute to increasing the availability of the useful elements, which are much more easily absorbed and transported to the vascular system of plants and better utilized, also causing an increase in the humic bacteria flora which must be present in a vital soil and increasing the exchange capacity of soils, mainly those which have been previously treated with exclusively inorganic manure.

The present invention therefore relates to a continuous process for the preparation of fertilizers from animal waste consisting of:
  a) subjecting said waste to anaerobic biological fermentation, for a period necessary to reduce the content of biodegradable organic substance to values, expressed as $BOD_5$, of between 300 and 2000,
  b) treating the aqueous suspension, resulting from step a), at temperatures ranging from 20° C. to 70° C., with $HNO_3$ until pH 1-2, for periods of 30-60 minutes to obtain a ratio available $P_2O_5$/total $P_2O_5$ of between 87% and 97%, in the suspension,
  c) treating the aqueous suspension, resulting from step b), with calcium hydroxide in such quantities as to obtain a suspension with pH 6.5-7 and a S.A.R. index lower than 6, with an addition of 100-100,000 ppm of $H_2O_2$, at 35% by weight, either before or after said treatment.

Depending on the temperature used in step b), it is also advantageous to operate in the following way:
  when step b) is carried out at temperatures lower than 50° C., it is preferable to add the $H_2O_2$ before the treatment of the suspension with calcium hydroxide, in quantities necessary to reduce the fecal streptococci to values lower than 2 MPN/100 ml and the mycetes to values lower than 100 MPN/1 ml.
  when step b) is carried out at temperatures higher than 50° C., it is preferable to add the $H_2O_2$ after the treatment of the suspension with calcium hydroxide, at room temperature and in such quantities as to obtain a suspension with an rH of 30-32.

The duration of the anaerobic fermentation in step a) obviously depends on the content of organic substance in the starting waste, as well as on the fermentation temperatures, generally ranging from 20° C. to 40° C. and on the pH, generally between 6 and 8. The content of biodegradable organic substance is monitored, during the fermentation, by means of $BOD_5$ (Biochemical oxygen demand) measurements.

During the anaerobic fermentation, there is the formation of biogas, mainly composed of methane which, after purification, is recovered and used for the energy requirements of the present process and for other purposes.

The acid treatment in step b) is generally carried out with aqueous solutions of 50-60% nitric acid by weight, until a pH of the aqueous suspension of from 1 to 2 is reached, thus obtaining also the substantial recovery of $NH_3$ present in the suspension and the total recovery of phosphorous substantially in an available form.

In the treatment referred to in step c), aqueous solutions of 5-20% by weight of calcium hydroxide are generally used, until a suspension is obtained having a pH of 6.5-7 and a S.A.R. index lower than 6, preferably lower than 4, where the S.A.R. index is defined by the equation:

$$S.A.R. = \frac{Na}{\sqrt{\frac{Ca + Mg}{2}}}$$

where the concentration of the elements is expressed in milliequivalents per liter.

The S.A.R. (sodium absorption ratio) Index is a parameter widely employed in the field of fertilizers for evaluating the soil modifying properties of a given fertilizer. The expression for the index is shown in the formula above. Of the cations in the equation, $Ca^{++}$ and $Mg^{++}$ are adsorbed by plants, whereas $Na^+$ is not. Sodium in fact remains in the soil. The accumulation of $Na^+$ in the soil increases the electrical conductivity of the soil itself, thereby gradually worsening the properties of the soil as a substrate for plant growth. Thus, the amount of sodium ions supplied to the soil must be kept as low as possible and should not exceed the limits indicated in the present specification.

Low S.A.R. indexes are necessary in order not to change the conductibility, aeration and texture of the agricultural soil.

The dosage of $H_2O_2$ using its aqueous solutions, generally 30-40% by weight, added either before or after treatment With calcium hydroxide, depends on the organic substance present and is regulated in such a way as to have an aqueous suspension which has a redox activity rH of 30-32, immediately after the addition of the $H_2O_2$.

This suspension is stable to storage for about 3 months with a limited formation of mycetes (mycetes<700 MPN/1 ml) and little development of unpleasant odours and/or phytotoxic substances.

The fertilizing suspension thus obtained can be used as such, or after dilution with water, in ferti-irrigation.

The ratio between the main fertilizing elements N, $P_2O_5$, $K_2O$ can also be adjusted to obtain a more suitable ratio for the cultivation in which it will be used.

It is therefore possible, without any draw-backs, to add mineral manure, organo-mineral manure, and potassium salts to balance the $K_2O$ title, to add $NH_3$ in step c) to balance the nitrogen title, to add ammonium phosphate having plenty of polyphosphates (>50%) to balance the nitrogen and $P_2O_5$ title.

It is also possible to add humic substances, of vegetable origin, allowing the formation of phosphohumates, thus making the phosphorous more available and metabolizable from plants, as well as the formation of humates and fulvates of metals such as Fe, Mn, Cu and Zn, which are gradually made available for the metabolic requirements of plants.

The fertilizer obtained with the process of the present invention has all the characteristics necessary for being safely preserved and distributed on agricultural soil using modern techniques of ferti-irrigation, and in particular:

it can be stored for at least 3 months with a very limited formation of mycetes (<700 MPN/1 ml) and without any release of unpleasant odours and/or phytotoxic substances, because of its low content of colibacteria (<2 MPN/100 ml), it can be used on cultivations to be eaten raw, such as salad, tomatoes, and other vegetables, without any danger to health, because of its almost neutral pH (6.5-7), it can be used without any damage to plants during the whole vegetative cycle, because of its low S.A.R. index (<6) it does not change the conductibility, aeration and texture of the soil, not even with continuative use, it has a balanced supply of the main nutritive elements (N, P, K) and secondary elements (Ca, Mg, S) as well as useful microelements (B, Mn, Zn, Cu, Mo, Co, Fe), in an easily available form for the metabolic needs of plants, and also a balanced supply of biodegraded organic substance, containing compounds with chelating and complexing functions or also of a colloidal nature which positively influence the protein metabolism of the plant, especially the synthesis and activity of the enzymes, as well as the absorption of minerals, and it also helps to limit the loss of nitrates normally washed away from the soil by perculating water, because of its high water content, it contributes to the irrigation needs of cultivations in areas or particularly in periods of the year where there is scarse rainfall or availability of water, as for example in the case of drought.

In fact, the process of the present invention as well as completely recovering animal waste and making it available as a fertilizer, avoids the disadvantages related to the alternative necessary means of waste-disposal by spreading, which can be summarized as follows:

it eliminates hygenic problems associated with the diffusion of pathogenous germs contained in enormous quantities of waste, by enabling the total recovery of phosphorous contained in the waste, it avoids its accumulating in water-courses and in the sea, which is the main cause of their eutrophization, it prevents the discharge of considerable harmful quantities of $NH_3$ in the atmosphere, enabling its total recovery by means of salification to ammonium nitrate, it prevents the discharge in the atmosphere of toxic and badly-smelling substances such as $H_2S$, mercaptans, indole skatole and the like, it avoids lengthy and costly treatment of the waste carried out in biological depurators, which are necessary, by law, to obtain water which is easily disposable in water-courses, in the sea and in the soil. Some examples follow to illustrate the present invention.

In the following examples the BOD>(Biochemical oxygen demand), COD (Chemical oxygen demand), rH (redox activity of the solutions) values, the number and type of protogenous germs and mycetes expressed as MPN (most probable number) have been determined in accordance with the methods described in APHA. AWWA. JWPCJ. "Standard Methods for the Examination of Water and Waste Water" XVI Ed., (Washington APHA 1985) and in the reports of the "Istituto di Ricerca sulle Acque—I.R.S.A. (CNR) "Metodi Analitici per le acque" (Methods of water analysis) No. 11, 1980.

EXAMPLE 1

A 70 l sample of pig waste was transformed into a fertilizer in an aqueous suspension, which was stable to storage, without any pathogenous agents or badly-smelling substances and consequently particularly suitable for use in ferti-irrigation.

The pig waste used had the characteristics shown in Table 1.

Said waste was subjected to anaerobic biological fermentation in mesophily (35° C.) over a period of 40 days. The characteristics of the product obtained from the fermentation are shown in Table 2.

A 25 liter sample of the product obtained from the fermentation was treated with $HNO_3$ (60% by weight) up to pH 1.3, at temperature of 60° C., over a period of 60 minutes.

The phosphorous content of the product obtained after the treatment with $HNO_3$ is the following:

| | | |
|---|---|---|
| Total phosphorous | ($P_2O_5$) | 1347 mg/l |
| Organic phosphorous | ($P_2O_5$) | 20 mg/l |
| Inorganic phosphorous | ($P_2O_5$) | 1327 mg/l |
| Available phosphorous | ($P_2O_5$) | 1247 mg/l |
| Available $P_2O_5$/total $P_2O_5$ | | 94% |
| Phosphorous sol. $H_2O$ | ($P_2O_5$) | 1020 mg/l |

The product treated as above with $HNO_3$ was subsequently neutralized with 10% $Ca(OH)_2$ by weight, up to pH 6.8 and, after cooling down to 30° C., 1000 ppm of 35% by weight of $H_2O_2$ was added.

A stable product was obtained, which did not contain any decaying or badly-smelling substances, and which resulted particularly suitable for ferti-irrigation, after dilution with water in a ratio of 1:10 by weight. The characteristics of the above product are shown in Table 3.

TABLE 1
SAMPLE OF SWINE WASTE DRAWN FROM THE COMPANY ZOOFARM IN FORLIMPOPOLI (Ex. 1)

| Characteristics: | | |
|---|---|---|
| pH | | 8.2 |
| $H_2O$ | | 97.30% |
| Uric acid | | 2.0 mg/l |
| Total nitrogen | (N) | 2805 mg/l |
| Ammonium nitrogen | (N) | 2005 mg/l |
| Ureic nitrogen | (N) | 343 mg/l |
| Nitric nitrogen | (N) | <10 mg/l |
| Organic nitrogen | (N) | 447 mg/l |
| Total phosphorous | ($P_2O_5$) | 1217 mg/l |
| Organic phosphorous | ($P_2O_5$) | 414 mg/l |
| Inorganic phosphorous | ($P_2O_5$) | 803 mg/l |
| Available phosphorous | ($P_2O_5$) | 700 mg/l |
| Phosphorous sol. $H_2O$ | ($P_2O_5$) | 257 mg/l |
| Total potassium | ($K_2O$) | 2250 mg/l |
| Total calcium | (Ca) | 838 mg/l |
| Total magnesium | (Mg) | 262 mg/l |
| Total sulphur | (S) | 209 mg/l |
| Total sodium | (Na) | 730 mg/l |
| S.A.R. Index | | 7.9 mg/l |
| Conductibility | | 18.0 mS/cm |
| Total carbon | (C) | 9475 mg/l |
| Extractable carbon | (C) | 5342 mg/l |
| Carbon from humic subst. | (C) | 2116 mg/l |
| HA + FA | | |
| COD | | 29000 mg/l |
| $BOD_5$ | | 10400 mg/l |
| Total coli | | 50 million MPN/100 ml |
| Fecal coli | | 16 million MPN/100 ml |
| Fecal streptococci | | 10 million MPN/100 ml |
| Mycetes | | <1000 MPN/1 ml |
| Salmonellae | | absent N/50 g |
| Microelements: | | |
| Iron | (Fe) | 43.6 mg/l |
| Copper | (Cu) | 10.2 mg/l |
| Manganese | (Mn) | 7.7 mg/l |
| Zinc | (Zn) | 15.9 mg/l |
| Cobalt | (Co) | <0.5 mg/l |
| Molybdenum | (Mo) | <0.5 mg/l |
| Boron | (B) | 2.7 mg/l |
| Toxic metals and non-metals: | | |
| Aluminium | (Al) | 9.9 mg/l |
| Arsenic | (As) | <1.0 mg/l |
| Barium | (Ba) | 5.0 mg/l |
| Cadmium | (Cd) | <0.5 mg/l |
| Chromium III | (Cr) | <0.5 mg/l |
| Chromium VI | (Cr) | <0.5 mg/l |
| Mercury | (Hg) | <0.5 mg/l |
| Nickel | (Ni) | <0.5 mg/l |
| Lead | (Pb) | <2.0 mg/l |
| Selenium | (Se) | <2.0 mg/l |
| Tin | (Sn) | <2.0 mg/l |

TABLE 1-continued
SAMPLE OF SWINE WASTE DRAWN FROM THE COMPANY ZOOFARM IN FORLIMPOPOLI (Ex. 1)

| | | |
|---|---|---|
| Chlorides | (Cl—) | 1420 mg/l |

TABLE 2
ANALYSIS OF SWINE WASTE AFTER ANAEROBIC BIOLOGICAL FERMENTATION AT 35° C. FOR A PERIOD OF 40 DAYS (EX. 1)

| | | |
|---|---|---|
| pH | | 8.2 |
| $H_2O$ | | 98.10% |
| Uric acid | | <1.0 mg/l |
| Total nitrogen | (N) | 2817 mg/l |
| Ammonium nitrogen | (N) | 2321 mg/l |
| Ureic nitrogen | (N) | 25 mg/l |
| Nitric nitrogen | (N) | 18 mg/l |
| Organic nitrogen | (N) | 453 mg/l |
| Total phosphorous | ($P_2O_5$) | 1226 mg/l |
| Organic phosphorous | ($P_2O_5$) | 42 mg/l |
| Inorganic phosphorous | ($P_2O_5$) | 1184 mg/l |
| Available phosphorous | ($P_2O_5$) | 995 mg/l |
| Available $P_2O_5$/total $P_2O_5$ | | 84% |
| Phosphorous sol. $H_2O$ | ($P_2O_5$) | 345 mg/l |
| Total potassium | ($K_2O$) | 2200 mg/l |
| S.A.R. Index | | 6.9 mg/l |
| Conductibility | | 20.5 mS/cm |
| Total carbon | (C) | 4739 mg/l |
| Extractable carbon | (C) | 2767 mg/l |
| Carbon from humic substances | (C) | 1035 mg/l |
| HA + FA | | |
| COD | | 9100 mg/l |
| $BOD_5$ | | 1260 mg/l |
| Total coliform bacteria | MPN/100 ml | 150 |
| Lower and upper limits | MPN/100 ml | 30–440 |
| Fecal coliform bacteria | MPN/100 ml | <3 |
| Lower and upper limits | MPN/100 ml | <0.5–9 |
| Fecal streptococci | MPN/100 ml | 93 |
| Lower and upper limits | MPN/100 ml | 15–380 |
| Mycetes | MPN/1 ml | 7000 |

TABLE 3
CHARACTERISTICS OF FINAL PRODUCT (EX. 1)

| | | |
|---|---|---|
| pH | | 6.8 |
| % $H_2O$ | | 94.97 |
| Uric acid | | <1.0 mg/l |
| Total nitrogen | (N) | 8133 mg/l |
| Ammonium nitrogen | (N) | 2590 mg/l |
| Ureic nitrogen | (N) | <1.0 mg/l |
| Nitric nitrogen | (N) | 4964 mg/l |
| Organic nitrogen | (N) | 579 mg/l |
| Total phosphorous | ($P_2O_5$) | 1387 mg/l |
| Organic phosphorous | ($P_2O_5$) | 50 mg/l |
| Inorganic phosphorous | ($P_2O_5$) | 1337 mg/l |
| Available phosphorous | ($P_2O_5$) | 1257 mg/l |
| Available $P_2O_5$/total $P_2O_5$ | | 94% |
| Phosphorous sol. $H_2O$ | ($P_2O_5$) | 560 mg/l |
| Total potassium | ($K_2O$) | 2260 mg/l |
| Total calcium | (Ca) | 2833 mg/l |
| Total magnesium | (Mg) | 339 mg/l |
| Total sulphur | (S) | 116 mg/l |
| Total sodium | (Na) | 831 mg/l |
| S.A.R. Index | | 3.9 mg/l |
| Conductibility | | 38.0 mS/cm |
| Total carbon | (C) | 4743 mg/l |
| Extractable carbon | (C) | 2300 mg/l |
| Carbon from humic substances | (C) | 938 mg/l |
| HA + FA | | |
| Total coliform bacteria | MPN/100 ml | 0 |
| Upper limit | MPN/100 ml | <2 |
| Fecal coliform bacteria | MPN/100 ml | 0 |
| Upper limit | MPN/100 ml | <2 |
| Fecal streptococci | MPN/100 ml | 0 |
| Upper limit | MPN/100 ml | <2 |
| Mycetes | MPN/1 ml | <5 |
| Salmonellae | N/50 g | absent |
| rH | | 31.65 |

EXAMPLE 2

A 25 liter sample of the product obtained after fermentation as described in Example 1, having the characteristics shown in Table 2, was treated with 60% by weight of $HNO_3$ up to a pH of 1.3, at a temperature of 35° C. and for a period of 60 minutes.

The content of phosphorous and pathogenous agents of the product obtained after the treatment with $HNO_3$ is the following:

| Total phosphorous | ($P_2O_5$) | 1230 mg/l |
|---|---|---|
| Organic phosphorous | ($P_2O_5$) | 38 mg/l |
| Inorganic phosphorous | ($P_2O_5$) | 1292 mg/l |
| Available phosphorous | ($P_2O_5$) | 1085 mg/l |
| Available $P_2O_5$/total $P_2O_5$ | | 91% |
| Phosphorous sol. $H_2O$ | ($P_2O_5$) | 1047 mg/l |
| Total coliform bacteria | MPN/100 ml | 43 |
| Lower and upper limits | MPN/100 ml | 7–210 |
| Fecal coliform bacteria | MPN/100 ml | <3 |
| Lower and upper limits | MPN/100 ml | <0.5–9 |
| Fecal streptococci | MPN/100 ml | 75 |
| Lower and upper limits | MPN/100 ml | 14–236 |
| Mycetes | MPN/1 ml | 2500 |

1000 ppm of 35% by weight of $H_2O_2$ were then added, at 35° C., to the acidified product.

The content of pathogenous agents was determined on the product after the above addition, with the following results:

| Total coliform bacteria | MPN/100 ml | <2.2 |
|---|---|---|
| Lower and upper limits | MPN/100 ml | 0–6 |
| Fecal coliform bacteria | MPN/100 ml | <2.2 |
| Lower and upper limits | MPN/100 ml | 0–6 |
| Fecal streptococci | MPN/100 ml | 2.2 |
| Lower and upper limits | MPN/100 ml | 0–6 |
| Mycetes | MPN/1 ml | <100 |
| rH | | 31.65 |

The product treated as described above, was then neutralized with 10% by weight of $Ca(OH)_2$, up to a pH of 6.8.

A stable end product was obtained, without any decaying or badly-smelling odours, of which the characteristics are shown in Table 4.

The product proved to be particularly suitable for ferti-irrigation after being diluted with water in a ratio of 1:10 by weight.

TABLE 4

| CHARACTERISTICS OF FINAL PRODUCT (EX. 2) | | |
|---|---|---|
| pH | | 6.8 |
| $H_2O$ | | 95.1% |
| Uric acid | | <1.0 mg/l |
| Total nitrogen | (N) | 8150 mg/l |
| Ammonium nitrogen | (N) | 2600 mg/l |
| Ureic nitrogen | (N) | <1.0 mg/l |
| Nitric nitrogen | (N) | 4981 mg/l |
| Organic nitrogen | (N) | 569 mg/l |
| Total phosphorous | ($P_2O_5$) | 1280 mg/l |
| Organic phosphorous | ($P_2O_5$) | 50 mg/l |
| Inorganic phosphorous | ($P_2O_5$) | 1230 mg/l |
| Available phosphorous | ($P_2O_5$) | 1119 mg/l |
| Available $P_2O_5$/total $P_2O_5$ | | 91% |
| Phosphorous sol. $H_2O$ | ($P_2O_5$) | 510 mg/l |
| Total potassium | ($K_2O$) | 2280 mg/l |
| Total calcium | (Ca) | 2810 mg/l |
| Total magnesium | (Mg) | 335 mg/l |
| Total sulphur | (S) | 115 mg/l |
| Total sodium | (Na) | 830 mg/l |
| S.A.R. Index | | 3.9 mg/l |
| Conductibility | | 38.0 mS/cm |
| Total carbon | (C) | 4780 mg/l |

TABLE 4-continued

| CHARACTERISTICS OF FINAL PRODUCT (EX. 2) | | |
|---|---|---|
| Extractable carbon | (C) | 2330 mg/l |
| Carbon from humic substances HA + FA | (C) | 942 mg/l |
| Total coliform bacteria | MPN/100 ml | <2.2 |
| Lower and upper limits | MPN/100 ml | 0–6 |
| Fecal coliform bacteria | MPN/100 ml | <2.2 |
| Lower and upper limits | MPN/100 ml | 0–6 |
| Fecal streptococci | MPN/100 ml | <2.2 |
| Lower and upper limits | MPN/1 ml | 0–6 |
| Mycetes | MPN/1 ml | <100 |
| Salmonellae | N/50 g | absent |
| rH | | 31.65 |

EXAMPLE 3

Comparison

A 10 liter sample of swine waste having the characteristics shown in Table 1 of Example 1, was treated with 60% by weight of $HNO_3$ up to a pH of 4.0, at a temperature of 25° C. and for a period of 24 hours.

1000 ppm of 35% by weight of $H_2O_2$ were then added to the product.

A product was obtained having the following content of pathogenous agents:

| Total coliform bacteria | MPN/100 ml | <3 |
|---|---|---|
| Lower and upper limits | MPN/100 ml | <0.5–6 |
| Fecal coliform bacteria | MPN/100 ml | <3 |
| Lower and upper limits | MPN/100 ml | <0.5–9 |
| Fecal streptococci | MPN/100 ml | <2.2 |
| Lower and upper limits | MPN/100 ml | 0.1–12.6 |
| Mycetes | MPN/1 ml | 5000 |
| Salmonellae | N/50 g | absent |
| rH | | 30.1 |

The product obtained was not stable and had a strong and persistent bad smell, indicating the presence of decaying substances and the release of badly-smelling volatile products all of which were phytotoxic.

Moreover, the product, after storage of 3 months, showed a considerable increase in the content of mycetes with values of 20,000 MPN/1 ml, making it unsuitable for use in ferti-irrigation.

On the contrary, the product obtained with the process of the present invention referred to in Example 1, after storage of 3 months, showed a content of mycetes of only 700 MPN/1 ml.

I claim:
1. A continuous process for the preparation of fertilizers from animal waste, consisting of:
   a) subjecting said waste to anaerobic biological fermentation, for a period sufficient to reduce the content of biodegradable organic substance to values, expressed as $BOD_5$, of between 300 and 2,000;
   b) treating the aqueous suspension, resulting from step a), at temperatures ranging from 20° C. to 70° C., with $HNO_3$ up to a pH of 1–2, for periods of 30–60 minutes to obtain a ratio available $P_2O_5$/total $P_2O_5$ of between 87% and 97% in suspension;
   c) adding 35% by weight $H_2O_2$ to a $H_2O_2$ concentration in the aqueous suspension of 100–100,000 ppm; and
   d) treating the aqueous suspension of step c) with calcium hydroxide in such quantities as to prepare a suspension having a pH of 6.5–7 and a S.A.R. index lower than 6.

2. The process of claim 1, wherein step b) is conducted at a temperature less than 50° C., and the amount of $H_2O_2$ added to the suspension is sufficient to reduce the fecal streptococci to values less than 2 MPN/100 ml and the mycetes to values less than 100 MPN/1 ml.

3. A continuous process for the preparation of fertilizers from animal waste, consisting of:
 a) subjecting said waste to anaerobic biological fermentation, for a period sufficient to reduce the content of biodegradable organic substance to values, expressed as $BOD_5$, of between 300 and 2,000;
 b) treating the aqueous suspension, resulting from step a), at temperatures ranging from 20° C. to 70° C., with $HNO_3$ up to a pH of 1-2, for periods of 30-60 minutes to obtain a ratio available $P_2O_2$/total $P_2O_5$ of between 87% and 97% in suspension;
 c) treating the aqueous suspension resulting from step b), with calcium hydroxide in such quantities as to prepare a suspension having a pH of 6.5-7 and a S.A.R. index lower than 6; and
 d) adding 35% by weight $H_2O_2$ to the calcium hydroxide treated aqueous suspension to a $H_2O_2$ concentration of 100-1000,000 ppm.

4. The process of claim 3, wherein step b) is conducted at a temperature greater than 50° C. and $H_2O_2$ is added to the $Ca(OH)_2$ treated suspension in a quantity so as to prepare a suspension having a rH of 30-32.

* * * * *